United States Patent
Muthukaruppan et al.

(10) Patent No.: US 10,666,554 B2
(45) Date of Patent: May 26, 2020

(54) INTER-CHASSIS LINK FAILURE MANAGEMENT SYSTEM

(71) Applicant: Dell Products L.P., Round Rock, TX (US)

(72) Inventors: Senthil Nathan Muthukaruppan, Askok Nagar Chennai (IN); Karthi Kaliyamoorthy, Tamil Nadu (IN)

(73) Assignee: Dell Products L.P., Round Rock, TX (US)

( * ) Notice: Subject to any disclaimer, the term of this patent is extended or adjusted under 35 U.S.C. 154(b) by 30 days.

(21) Appl. No.: 15/951,009

(22) Filed: Apr. 11, 2018

(65) Prior Publication Data

US 2019/0319875 A1  Oct. 17, 2019

(51) Int. Cl.
| | |
|---|---|
| *H04L 12/703* | (2013.01) |
| *H04L 12/753* | (2013.01) |
| *H04L 12/709* | (2013.01) |
| *H04L 12/939* | (2013.01) |
| *H04L 29/14* | (2006.01) |
| *H04L 12/46* | (2006.01) |

(52) U.S. Cl.
CPC ............ *H04L 45/28* (2013.01); *H04L 45/245* (2013.01); *H04L 69/40* (2013.01); *H04L 12/4641* (2013.01)

(58) Field of Classification Search
CPC ....... H04L 45/28; H04L 69/40; H04L 45/245; H04L 12/4641
See application file for complete search history.

(56) References Cited

U.S. PATENT DOCUMENTS

| | | | | |
|---|---|---|---|---|
| 2009/0092043 | A1* | 4/2009 | Lapuh | H04L 49/552 370/228 |
| 2014/0355615 | A1* | 12/2014 | Chang | H04L 45/64 370/392 |
| 2015/0288561 | A1* | 10/2015 | Liang | H04L 45/245 370/228 |
| 2016/0234100 | A1* | 8/2016 | Pathangi Narasimhan | H04L 45/48 |

\* cited by examiner

*Primary Examiner* — Kiet Tang
(74) *Attorney, Agent, or Firm* — Haynes and Boone, LLP

(57) ABSTRACT

An Inter-Chassis Link (ICL) failure management system includes a first switch device and a second switch device coupled together by an Inter-Chassis Link (ICL) that is included in a control network and that is configured to provide a primary control channel for transmitting control information between the first switch device and the second switch device. A third switch device is coupled to each of the first switch device and the second switch device by a first aggregated link. When the first switch device determines that the ICL is unavailable, it causes a first port and a second port that provide the first aggregated link to be added to the control network to provide a primary backup control channel. The first switch device may then send control information to the second switch device through the primary backup control channel via the first port and the second port.

20 Claims, 11 Drawing Sheets

INTER-CHASSIS LINK FAILURE MANAGEMENT SYSTEM

BACKGROUND

The present disclosure relates generally to information handling systems, and more particularly to managing failures of inter-chassis links between information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems such as, for example, switch devices, use aggregation protocols that allow for the aggregation of links between multiple switch devices. For example, Virtual Link Trunking (VLT) is a proprietary, layer-2 aggregation protocol utilized by switch devices available from DELL® Inc. of Round Rock, Tex., United States, and provides for the aggregation of links to multiple logical switch devices. In some configurations, switch devices (also referred to as VLT peer devices in VLT systems) may be coupled together by an Inter-Chassis Link (ICL) (also referred to as a VLT interconnect (VLTi) in VLT systems) that may be an aggregation of links (e.g., a Link Aggregation Group (LAG)) between those switch devices and that may be used to exchange control information (e.g., VLT control information). In addition, each of the VLT peer devices may be coupled via their "VLT ports" to Top Of Rack (TOR) switch devices using port channel interfaces (also referred to as VLT LAGs) that span across the VLT peer devices, as well as coupled via "orphan ports" (non-VLT ports) to host devices in some situations. The failure of the ICL between VLT peer devices can raise several issues.

For example, when an ICL between VLT peer devices fails, the VLT peer devices are isolated from each other because the ICL is no longer available for exchanging VLT control information between the VLT peer devices. As such, functionality associated with the Address Resolution Protocol (ARP), Media Access Control (MAC), Spanning Tree Protocol (STP), and/or other control operations will be unavailable. In a specific example, ARP learning failures can lead to new layer-3 streams being blocked, as the control information exchange enabled by the ICL is needed to learn addresses associated with those layer-3 streams so that they can be forwarded properly (e.g., when a first VLT peer device receives a packet that has been incorrectly hashed and needs to be forwarded to a second VLT peer device.) In another specific example, MAC synchronization failure can lead to new layer-2 streams being flooded instead of unicasted, as when a first VLT peer device cannot access a second VLT peer device via the ICL to unicast a received packet, it may flood that packet to the network. In yet another specific example, the STP may be unable to detect loops in the VLT fabric without the control communication enabled by the ICL.

Conventional solutions to these issues associated with ICL failure typically operate to disable any VLT ports on a secondary VLT peer device when the ICL between that secondary VLT peer device and a primary VLT peer device fails. While this solution avoids some of the issues discussed above such as those due to incorrect hashing, as well as those due to the the formation of temporary loops, it results in a reduction of the availability of the VLT fabric (e.g., by 50% due to the unavailability of the VLT ports on the VLT peer device that is made unavailable), as well as a reduction in the overall bandwidth of the VLT fabric that can lead to traffic loss. Furthermore, any "east-west" traffic (e.g., traffic between the host devices connected to the VLT peer devices) may be blocked by such solutions as well.

Accordingly, it would be desirable to provide an improved Inter-Chassis Link (ICL) failure management system.

SUMMARY

According to one embodiment, an Information Handling System includes a processing system; and a memory system that is coupled to the processing system and that is configured to execute instructions from the memory system to provide an Inter-Chassis Link (ICL) failure management engine that is configured to: determine that an ICL, which is included in a control network and configured to provide a primary control channel for transmitting control information to a first switch device, is unavailable; cause a first port and a second port, which provide a first aggregated link to a second switch device, to be added to the control network to provide a primary backup control channel; and send control information to the first switch device through the primary backup control channel via the first port and the second port.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
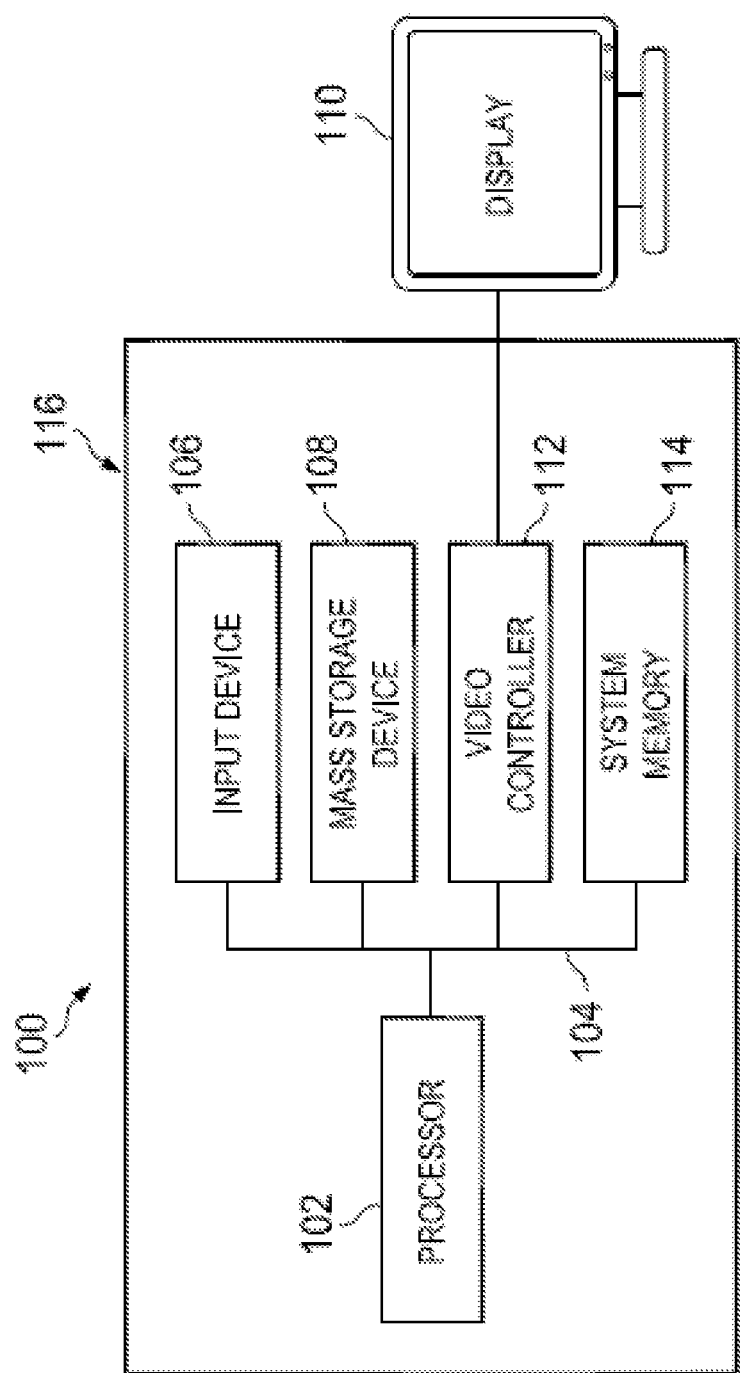
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
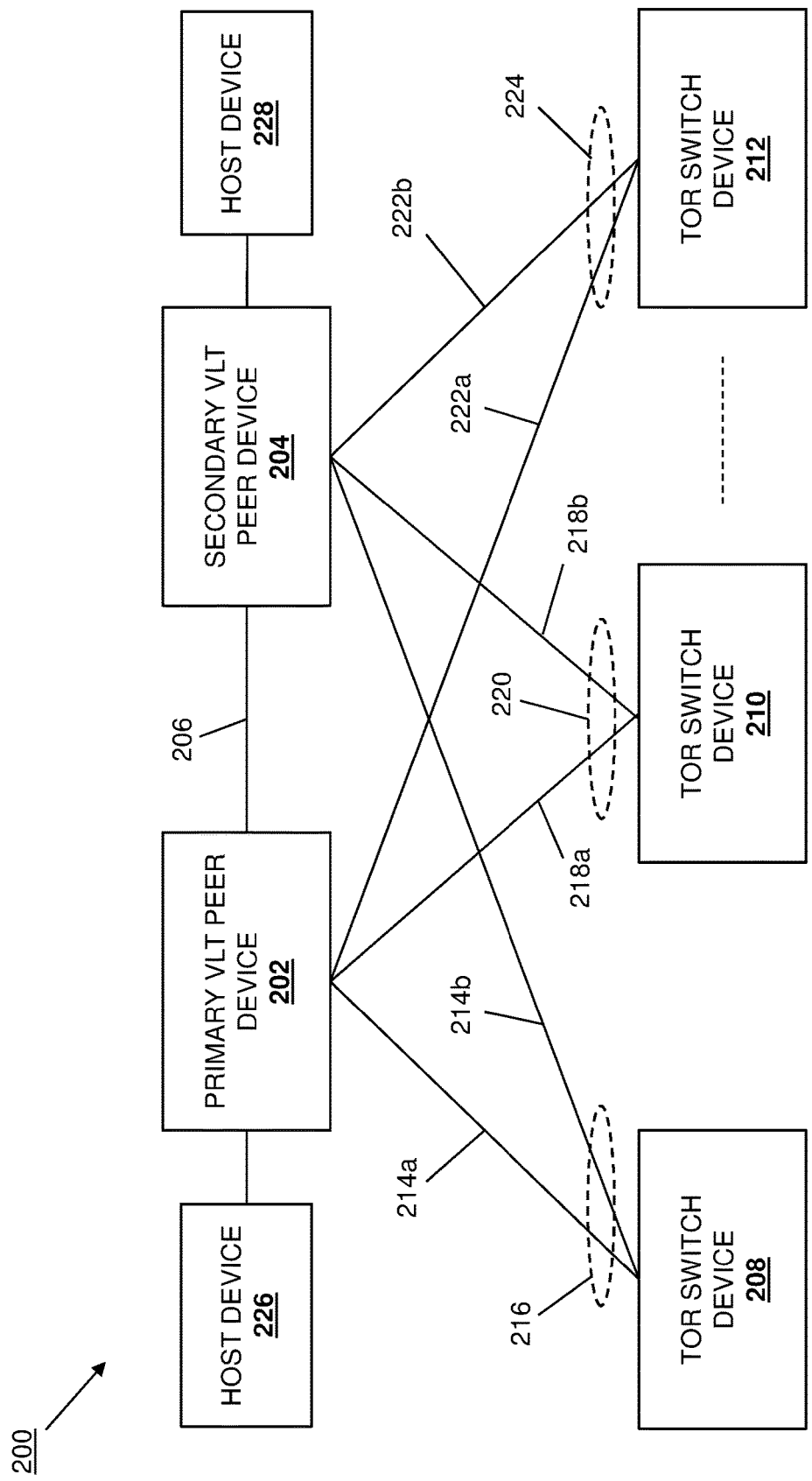
FIG. 2 is a schematic view illustrating an embodiment of a Virtual Link Trunking (VLT) fabric.

Referring now to FIG. 2, an embodiment of an Inter-Chassis Link (ICL) failure management system 200 is illustrated. In the illustrated embodiment, the ICL failure management system 200 includes a pair of switch devices, either of both of which may be provided by the IHS 100 discussed above with reference to FIG. 1 and/or may include some or all of the components of the IHS 100. In the embodiments discussed below, the switch devices are illustrated and described as a primary Virtual Link Trunking (VLT) peer device 202 and a secondary VLT peer device 204. As would be understood by one of skill in the art in possession of the present disclosure, VLT is a proprietary aggregation protocol that may be provided in devices provided by DELL®, Inc. of Round Rock, Tex., United States, in order to allow an aggregated link with two different devices, although other aggregation protocols may benefit from the teachings of the present disclosure and thus are envisioned as falling within its scope as well. The primary VLT peer device 202 and the secondary VLT peer device 204 are coupled together by an Inter-Chassis Link (ICL) 206 (also called a VLT interface (VLTi) in VLT systems). The ICL 206 may include a plurality of aggregated links (i.e., each provided between respective ports on the primary VLT peer device 202 and the secondary VLT peer device 204), although ICLs are typically utilized for control information exchange and often utilize only a minimum number of links (e.g., 1 link, or 2 aggregated links) for the "control channel" provided by the ICL 206. As would be understood by one of skill in the art in possession of the present disclosure, the ICL 206 may belong to a control network such as, for example, the control Virtual Local Area Network (VLAN) (e.g., also referred to as "VLAN 4094" below) discussed in the examples provided herein.

Each of the primary VLT peer device 202 and the secondary VLT peer device 204 is may be coupled to a plurality of switch devices, any or all of which may be provided by the IHS 100 discussed above with reference to FIG. 1 and/or include some or all of the components of the IHS 100. In the embodiments discussed below, those switch devices are illustrated and described as Top-Of-Rack (TOR) switch devices 208, 210, and up to 212, although other types of switch devices may fall within the scope of the present disclosure as well. For example, in the illustrated embodiment, the TOR switch device 208 is coupled to the primary VLT peer device 202 by a link 214a, and coupled to the secondary VLT peer device 204 by a link 214b, with the links 214a and 214b aggregated (e.g., via a VLT Link Aggregation Group (LAG)) to provide VLT port 216 (e.g., a port-interface that spans across the primary VLT peer device 202 and the secondary VLT peer device 204.) Furthermore, the TOR switch device 210 is coupled to the primary VLT peer device 202 by a link 218a, and coupled to the secondary VLT peer device 204 by a link 218b, with the links 218a and 218b aggregated (e.g., via a VLT LAG) to provide a VLT port 220 (e.g., a port-interface that spans across the primary VLT peer device 202 and the secondary VLT peer device 204.) Further still, the TOR switch device 212 is coupled to the primary VLT peer device 202 by a link 222a, and coupled to the secondary VLT peer device 204 by a link 222b, with the links 222a and 222b aggregated (e.g., via a VLT LAG) to provide a VLT port 224 (e.g., a port-interface that spans across the primary VLT peer device 202 and the secondary VLT peer device 204.)

In the illustrated embodiment, a host device 226 may be coupled to the primary VLT peer device 202 (e.g., via an "orphan" port (a non-VLT port) on the primary VLT peer device 202), and a host device 228 may be coupled to the secondary VLT peer device 204 (e.g., via an orphan port/non-VLT port) on the secondary VLT peer device 204. The host devices 226 and 228 may be provided by the IHS 100 discussed above with reference to FIG. 1 and/or include some or all of the components of the IHS 100, and in many embodiments may include switch devices as well. While a specific ICL failure management system 200 has been illustrated and described, one of skill in the art in possession of the present disclosure will recognize that an ICL failure management system may include a variety of other devices and/or device configurations other than those illustrated while remaining within the scope of the present disclosure.

Figure 3:
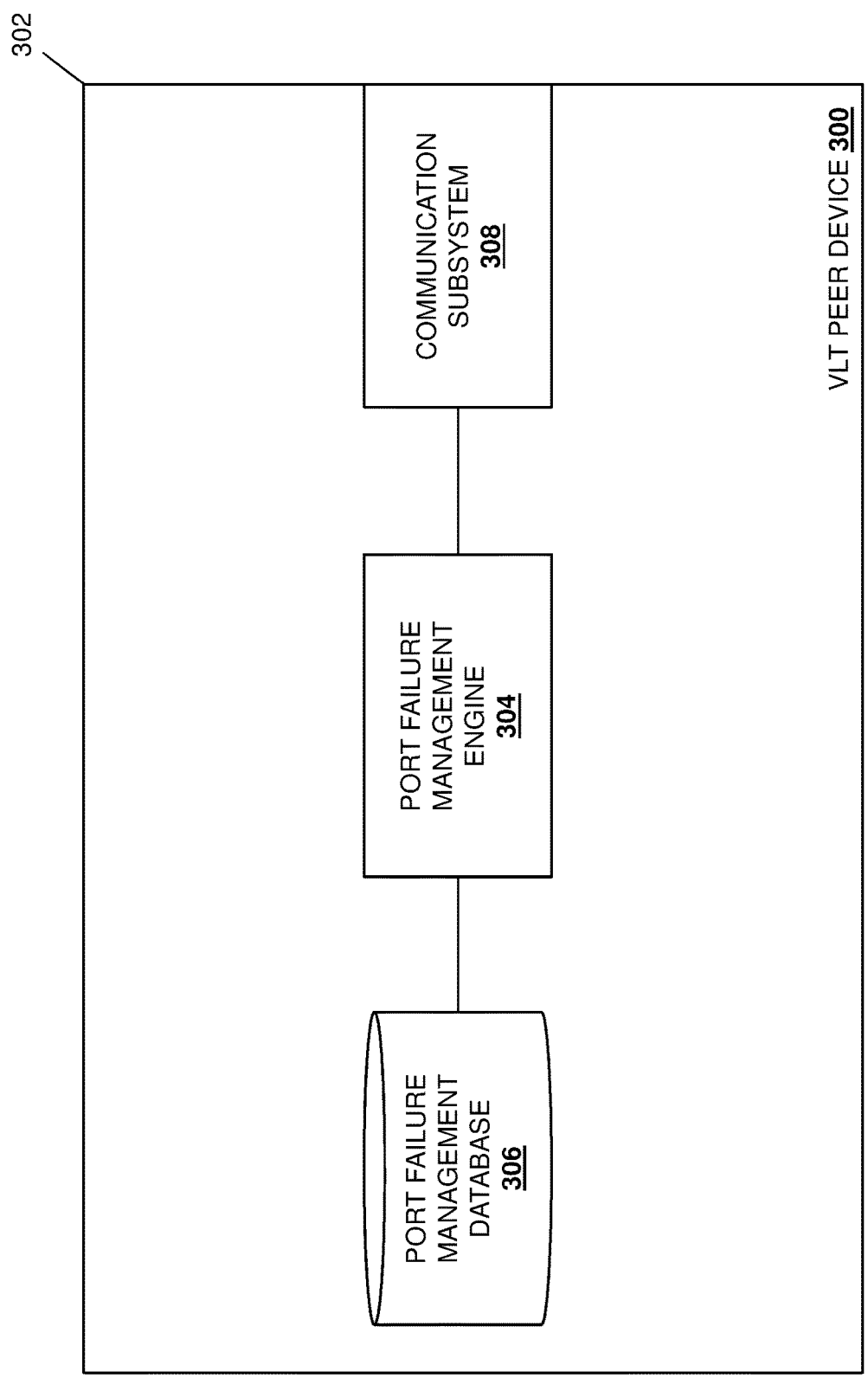
FIG. 3 is a schematic view illustrating an embodiment of a VLT peer device that may be included in the VLT fabric of FIG. 2.

Referring now to FIG. 3, an embodiment of a VLT peer device 300 is illustrated. In an embodiment, the VLT peer device 300 may provide either or both of the primary VLT peer device 202 and the secondary VLT peer device 204 discussed above with reference to FIG. 2 and, as such, may be provided by the IHS 100 discussed above with reference to FIG. 1 and/or include some or all of the components of the IHS 100. In the illustrated embodiment, the VLT peer device 300 includes a chassis 302 that houses the components of the VLT peer device 300, only some of which are illustrated in FIG. 3. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a port failure management engine 304 that is configured to perform the functions of the port failure management engines and/or VLT peer devices discussed below.

The chassis 302 may also house a storage system (not illustrated, but which may include the storage device 108 discussed above with reference to FIG. 1) that is coupled to the port failure management engine 304 (e.g., via a coupling between the storage system and the processing system) and that includes a port failure management database 306 that is configured to store any of the information utilized to provide the functionality discussed below. The chassis 302 may also house a communication subsystem 308 that is coupled to the port failure management engine 304 (e.g., via a coupling between the communication subsystem 308 and the processing system) that may include a Network Interface Controller (NIC), a wireless communication subsystem (e.g., a BLUETOOTH® communication subsystem, a Near Field Communication (NFC) subsystem, a WiFi communication subsystem), and/or other communication components for providing the links (e.g., the links 206, 214a, 214b, 218a, 218b, 222a, 222b, etc.) and/or other communication functionality discussed herein. While a specific VLT peer device 300 has been described, one of skill in the art in possession of the present disclosure will recognize that a VLT peer device may include a variety of other components and/or components configurations for providing conventional VLT peer device functionality, as well as the functionality discussed below, while remaining within the scope of the present disclosure.

Figure 4:
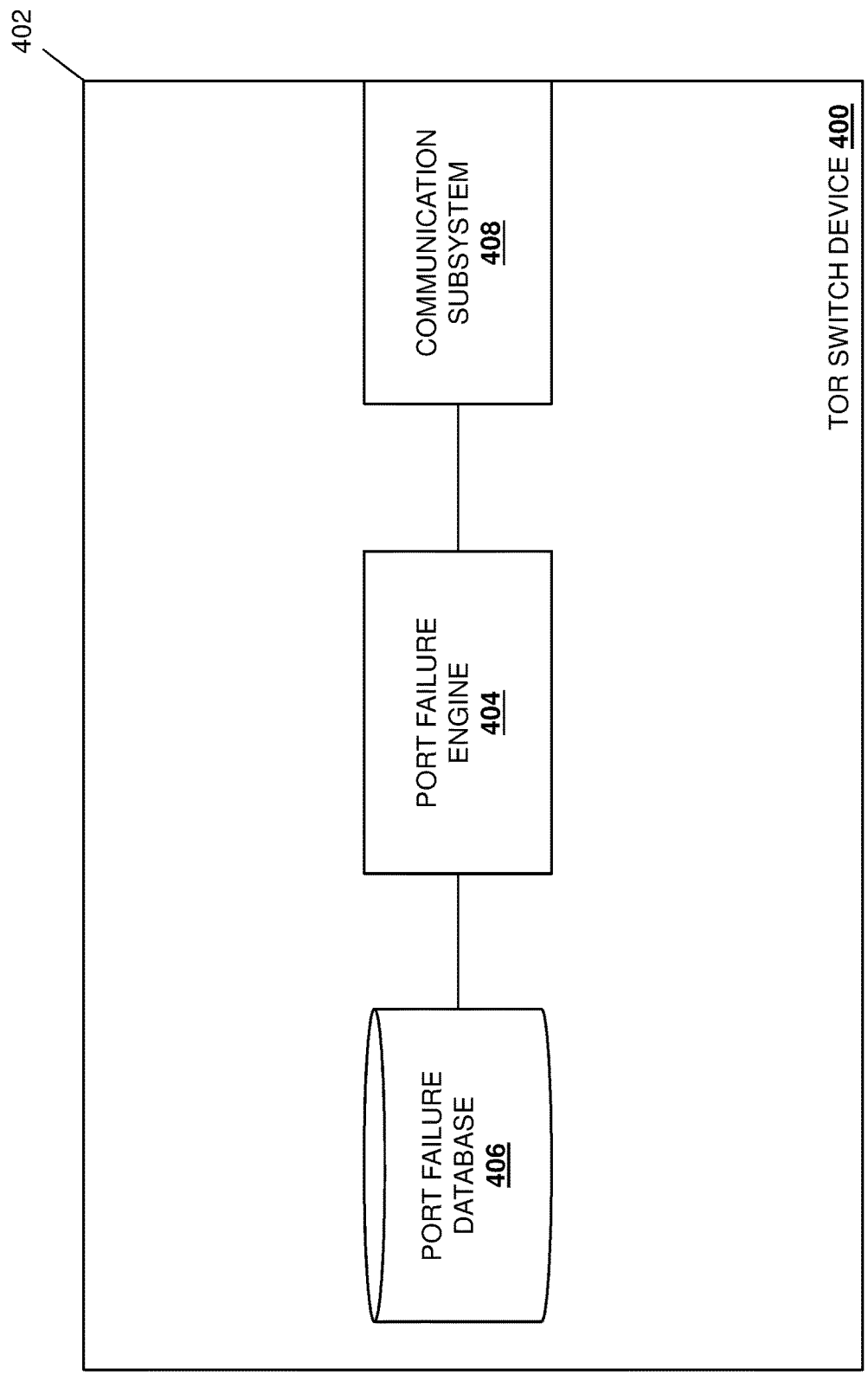
FIG. 4 is a schematic view illustrating an embodiment of a Top Of Rack (TOR) switch device that may be included in the VLT fabric of FIG. 2.

Referring now to FIG. 4, an embodiment of a TOR switch device 400 is illustrated. In an embodiment, the TOR switch device 400 may provide any or all of the TOR switch devices 208, 210, and 212 discussed above with reference to FIG. 2 and, as such, may be provided by the IHS 100 discussed above with reference to FIG. 1 and/or include some or all of the components of the IHS 100. In the illustrated embodiment, the TOR switch device 400 includes a chassis 402 that houses the components of the TOR switch device 400, only some of which are illustrated in FIG. 4. For example, the chassis 402 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a port failure engine 404 that is configured to perform the functions of the port failure engines and/or TOR switch devices discussed below.

The chassis 402 may also house a storage system (not illustrated, but which may include the storage device 108 discussed above with reference to FIG. 1) that is coupled to the port failure engine 404 (e.g., via a coupling between the storage system and the processing system) and that includes a port failure database 406 that is configured to store any of the information utilized to provide the functionality discussed below. The chassis 402 may also house a communication subsystem 408 that is coupled to the port failure engine 404 (e.g., via a coupling between the communication subsystem 308 and the processing system) that may include a Network Interface Controller (NIC), a wireless communication subsystem (e.g., a BLUETOOTH® communication subsystem, a Near Field Communication (NFC) subsystem, a WiFi communication subsystem), and/or other communication components for providing the links (e.g., the links 214a, 214b, 218a, 218b, 222a, 222b, etc.) and/or other communication functionality discussed herein. While a specific TOR switch device 400 has been described, one of skill in the art in possession of the present disclosure will recognize that a TOR switch device may include a variety of other components and/or components configurations for providing conventional TOR switch device functionality, as well as the functionality discussed below, while remaining within the scope of the present disclosure.

Figure 5:
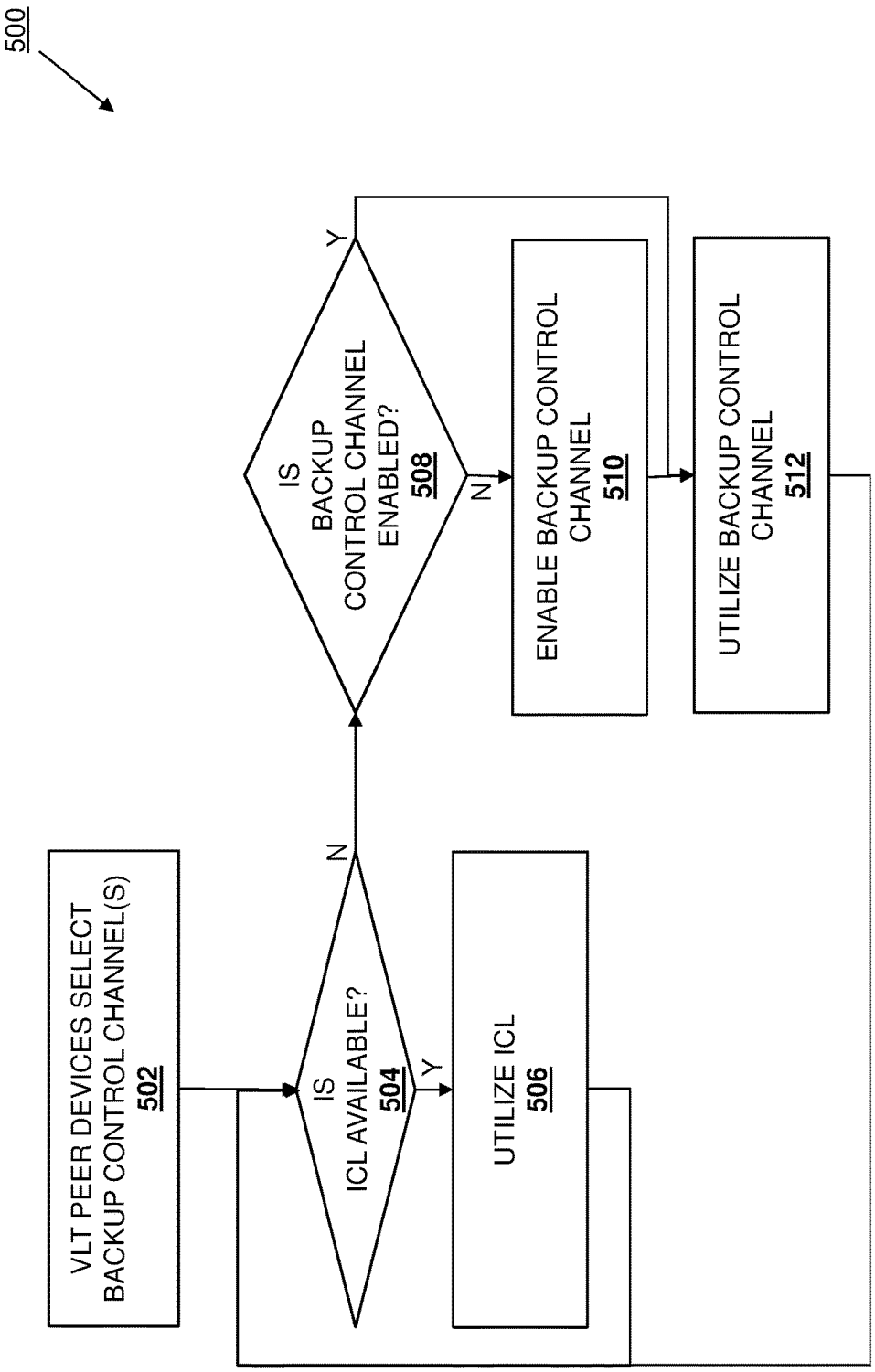
FIG. 5 is a flow chart illustrating an embodiment of a method for managing Inter-Chassis Link (ICL) failures.

Referring now to FIG. 5, an embodiment of a method 500 for managing ICL failures is illustrated. As discussed below, the systems and methods of the present disclosure provide for the management of failure in an ICL between VLT peer devices by selecting VLT port(s) that are connected to TOR switch device(s) to provide backup control channel(s) in the event of that failure. In the event the ICL becomes unavailable, the VLT port that was selected to provide the backup control channel is caused to split to provide a first port (e.g., the VLT port) and a second port (e.g., a backup port channel) that are each added to a control VLAN that included the ICL. Following the addition of the first port and the second port to the control VLAN, VLT control information may be sent from a first VLT peer device, through the VLT port, through the TOR switch device, through the backup port channel, and to the second VLT peer device. The backup control channel(s) may include a primary backup control channel that may be used when the ICL is unavailable, and a secondary backup control channel that may be used when both the ICL and the primary backup control channel are unavailable. Upon recovery of the ICL (e.g., when the ICL has become available again), the first port and the second port may be removed from the control VLAN, and the ICL may be used for transmitting any further control information.

The method 500 begins at block 502 where VLT peer devices select backup control channel(s). In an embodiment, at block 502, the port failure management engine 304 in each of the primary VLT peer device 202 and the secondary VLT peer device 204 operates to select one of the VLT ports 216, 220, and up to 224 to provide a primary backup control channel in the event the ICL 206 fails, and may select one of the VLT ports 216, 220, and up to 224 to provide a secondary backup control channel in the event the ICL 206 and the primary backup control channel fail. In the examples discussed below, the port failure management engine(s) 304 operate to select the VLT port 216 as the primary backup control channel (also referred to as a "candidate port-channel"), and select the VLT port 220 as the secondary backup control channel (also referred to as a "backup candidate port-channel"). The selection and/or other details of the backup control channels at block 502 may be stored by the port failure management engine 304 in the port failure management database 306. Furthermore, in some embodiments, backup control channels may be dedicated for the exchange of control information and incorrectly hashed packets between the primary VLT peer device 202 and the secondary VLT peer device 204, although the exchange of other types of data may fall within the scope of the present disclosure as well.

The selection of the VLT port(s) to provide the primary backup control channel/candidate port-channel and, in some embodiments, the secondary backup control channel/backup candidate port-channel may be performed using a variety of criteria. For example, backup control channel selection algorithms may be provided by the port failure management engine 304 to select VLT ports that are operational (i.e., not "down" with respect to either of the VLT peer devices), spanned across VLT peer devices (i.e., "one-armed" VLT ports connected to a single VLT peer device may not be considered), that have a relatively high number of VLT member ports (i.e., compared to the other VLT ports being considered), that have a relatively high number of active VLT members (i.e., compared to the other VLT ports being considered), and/or that have a relatively high total aggregate bandwidth (i.e., compared to the other VLT ports being considered). In addition, with regard to the selection of the VLT ports for providing the primary backup control channel and the secondary backup control channel, VLT ports/port channels terminating on different TOR switch devices may be selected for the respective primary backup control channel and the secondary backup control channel to ensure successful failover to the secondary backup control channel in the event of a failure of the TOR switch device that provides the primary backup control channel. However, while a number of specific criteria for selecting a backup control channel and/or primary/secondary backup control channels have been described, one of skill in the art in possession of the present disclosure will recognize that other criteria for selecting backup control channel(s) at block 502 will fall within the scope of the present disclosure as well.

The method 500 then proceeds to decision block 504 where it is determined whether an ICL between the VLT peer devices is available. In an embodiment, at decision block 504, the port failure management engine 304 in each of the primary VLT peer device 202 and the secondary VLT peer device 204 operates to determine whether the ICL 206 is unavailable for transmitting information between the primary VLT peer device 202 and the secondary VLT peer device 204 (e.g., whether the link provided by the ICL is "up" or otherwise operational.) If, at decision block 504, it is determined that the ICL between the VLT peer devices is available, the method 500 proceeds to block 506 where the ICL between the VLT peer devices is utilized. In an embodiment, at block 506, the primary VLT peer device 202 and the secondary VLT peer device 204 may exchange data (e.g., control information, data communicated between the host devices 226 and 228, packets that have been provided to an incorrect one of the primary and secondary VLT peer devices due to incorrect hashing, etc.)

Figure 8A:
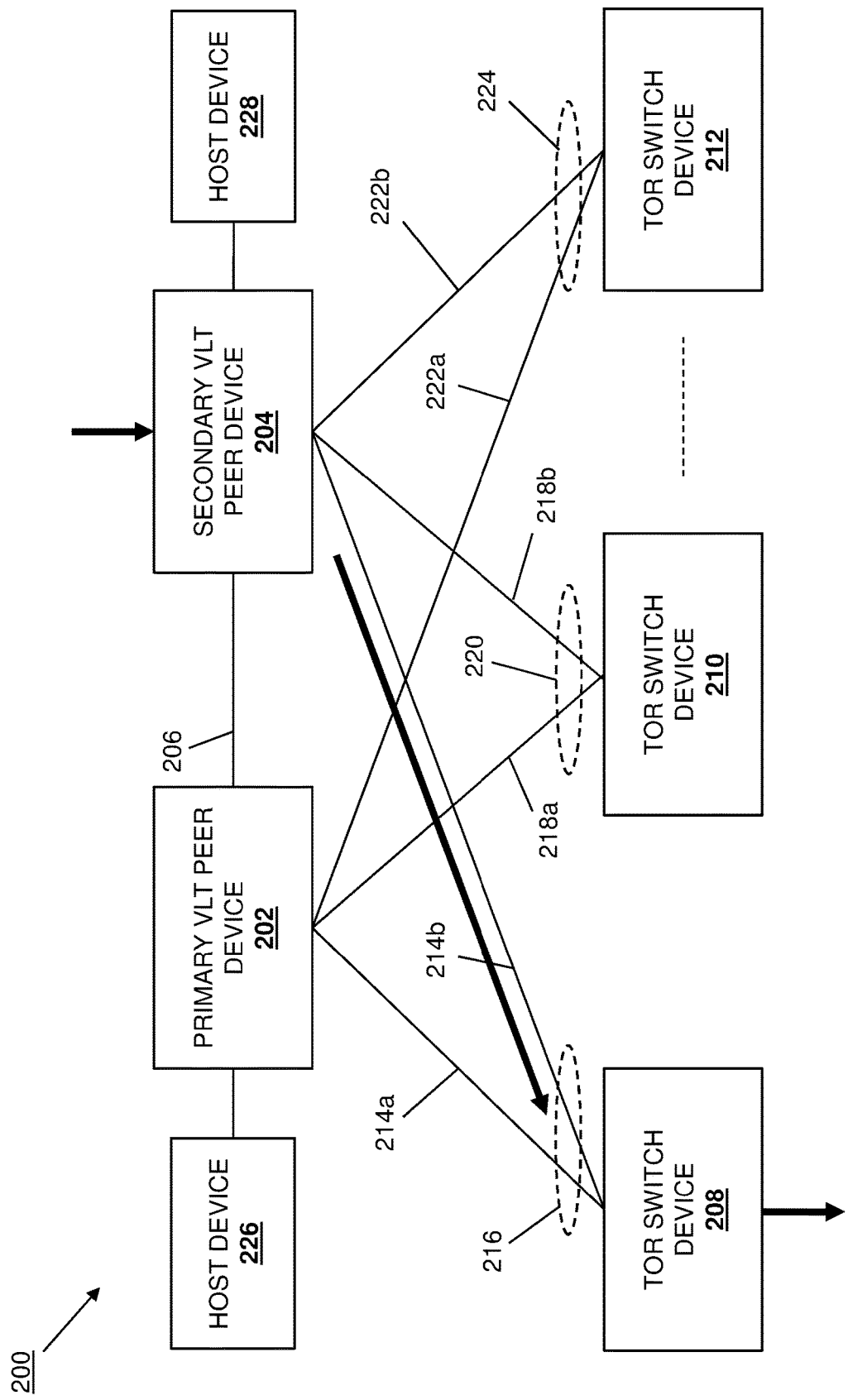
FIG. 8A is a schematic view illustrating an embodiment of data traffic flow in the VLT fabric of FIG. 6A prior to ICL failure.

With reference to FIG. 8A, the VLT fabric 200 is illustrated with the ICL 206 available. As can be seen, data traffic received at the secondary VLT peer device 204 may be transmitted over the link 214b to the VLT port 216 to the TOR switch device 208, and from the TOR switch device 208 to its destination. In addition, the primary VLT peer device 202 and the secondary VLT peer device 204 may utilize the ICL 206 to exchange control information. The method 500 then returns to decision block 504 to determine whether the ICL 206 between the primary VLT peer device 202 and the secondary VLT peer device 204 is available. As such, the method 500 may loop through blocks 504 and 506 as long as the ICL 206 is available for transmitting data between the primary VLT peer device 202 and the secondary VLT peer device 204.

Figure 6A:
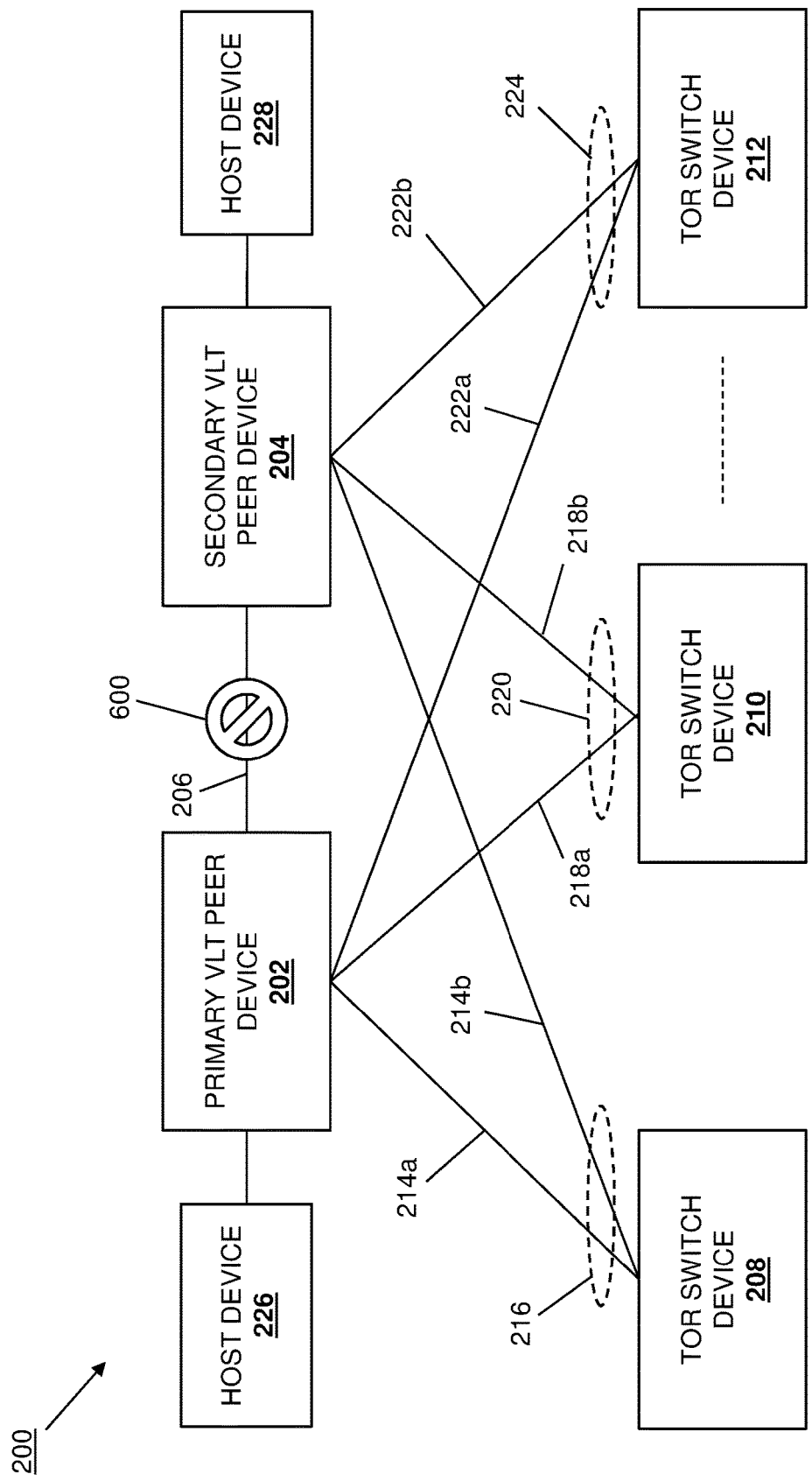
FIG. 6A is a schematic view illustrating an embodiment of a failed ICL in the VLT fabric of FIG. 2.

As would be understood by one of skill in the art in possession of the present disclosure, the ICL 206 may become unavailable in response to link failures, accidental disablement of ICL ports, and/or other unavailability scenarios that would be apparent to one of skill in the art in possession of the present disclosure. As such, the unavailability of the ICL 206 may be detected by the port failure management engine(s) 304 in response to, for example, the VLT peer devices 202 and 204 receiving a notification of such from their local interface management modules, or via other notification techniques that would be apparent to one of skill in the art in possession of the present disclosure. With reference to FIG. 6A, an embodiment of the ICL failure management system 200 is illustrated with the ICL 206 unavailable (as indicated by element 600 in FIG. 6A.) As discussed above, the situation illustrated in FIG. 6A results in control traffic between the primary VLT peer device 202 and the secondary VLT peer device 204 being blocked, which can result in several problems. For example, packets may be incorrectly hashed and provided to the primary VLT peer device 202 when they should have been provided to the secondary VLT peer device 204 (i.e., if they were correctly hashed), and the primary VLT peer device 202 will be unable to synchronize the relevant information in that packet with the secondary VLT peer device 204 due to the unavailability of the ICL 206. Furthermore, the inability of the primary VLT peer device 202 and the secondary VLT peer device 204 to exchange control data via the ICL 206 may cause Address Resolution Protocol (ARP) operations to fail. Further still, the inability of the primary VLT peer device 202 and the secondary VLT peer device 204 to exchange control data via the ICL 206 may cause Media Access Control (MAC) synchronization operations to fail, which can lead to the flooding of layer-2 traffic received by a VLT peer device (rather than unicasting directly to the other VLT peer device via the ICL 206.) Further still, the lack of communication via the ICL 206 may prevent the Spanning Tree Protocol from detecting loops in the VLT fabric. These and other issues can prevent new streams and/or new users from being supported via the VLT fabric until the ICL 206 becomes available again.

Figure 6B:
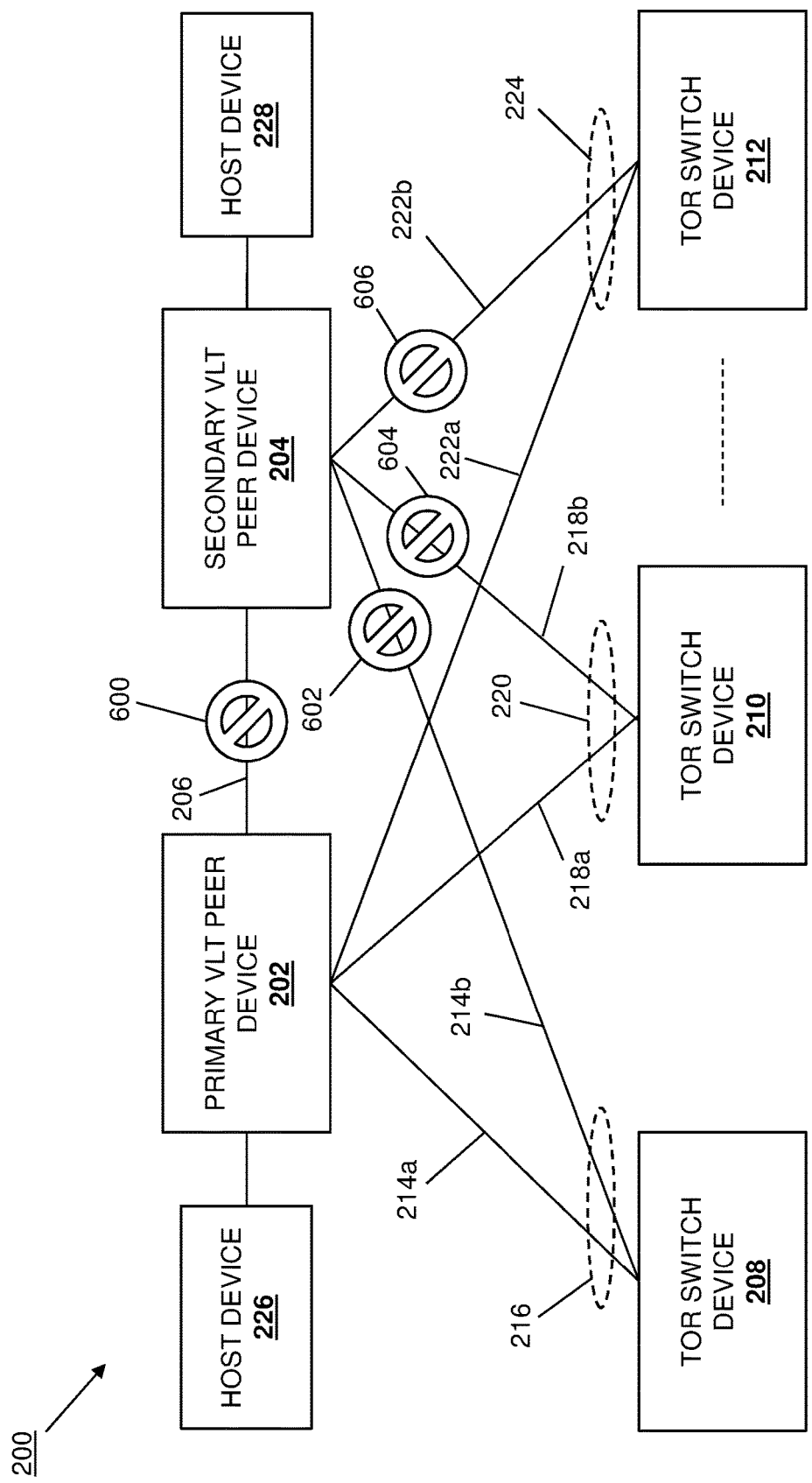
FIG. 6B is a schematic view illustrating an embodiment of the disabling of VLT ports to a secondary VLT peer device in response to the failed ICL of FIG. 6A.

Referring now to FIG. 6B, an embodiment of the conventional solution to ICL failure is illustrated. As discussed above, in the event of the failure of the ICL 206, the VLT ports to the secondary VLT peer device 204 may be shut down (as indicated by elements 602, 604, and 606 in FIG. 6B), which can prevent the issues due to incorrect hashing discussed above, and prevent loops from forming. However, such solutions can reduce the availability of the VLT fabric by 50% with respect to the VLT ports (as illustrated by the unavailability of the VLT ports to the secondary VLT peer device 204 in FIG. 6B), a condition which persists until the ICL 206 is once again available, and which is associated with an extended delay time in making those VLT ports available again once the ICL 206 is available (e.g., due to the need for the devices providing the VLT ports to exchange information and complete initial convergence.). In addition, such solutions also reduce the amount of overall bandwidth available, which can lead to data traffic loss. Finally, such solutions also completely block east-west data traffic (e.g., the traffic between the host devices 226 and 228.) Thus, as detailed with respect to FIGS. 6A and 6B, conventional solutions to ICL failures are associated with a variety of problems.

If, at decision block 504, it is determined that the ICL between the VLT peer devices is unavailable, the method 500 proceeds to decision block 508 where it is determined whether a backup control channel between the VLT peer devices has been enabled. As discussed below, the backup control channel for the primary VLT peer device 202 and the secondary VLT peer device 204 may be enabled following the determination that the ICL 206 has become unavailable, and may remain enabled until the ICL becomes available. As such, decision block 508 operates to determine whether a backup control channel must be enabled, or has already been enabled and may be utilized while the ICL 206 is unavailable. As discussed below, the use of the backup control channel avoids the shutting down of all of the VLT ports to the secondary VLT peer device 204 (as illustrated in FIG. 6B), and supports new streams via the ARP, while allowing the STP to detect loops.

If, at decision block 508, it is determined that a backup control channel has not been enabled (e.g., following the determination that the ICL 206 in unavailable in a first iteration of the method 500), the method 500 proceeds to block 510 where a backup control channel between the VLT peer devices is enabled. In an embodiment, at block 502, the VLT port 216 may have been selected as the primary backup control channel and, at block 510, the primary VLT peer device 202, the secondary VLT peer device 204, and the TOR switch device 208 may operate to split the VLT port 216 into two interfaces and add those two interfaces to the control network (e.g., the control VLAN that included the ICL 206). For example, at block 510 and upon determining that the ICL 206 is unavailable, the port failure management engine 304 in the secondary VLT peer device 204/300 may operate to send a message (e.g., a Link Layer Discovery Protocol (LLDP) message) through the VLT port 216 that instructs the TOR switch device 208 to split the VLT port 216 into a split VLT port 216a and a backup port channel 700, and add both the split VLT port 216a and the backup port channel 700 to the control VLAN (e.g., VLAN 4094). In response, the port failure engine 404 in the TOR switch device 208/400 may operate to split the VLT port 216 into the split VLT port 216a and the backup port channel 700, and add both the split VLT port 216a and the backup port channel 700 to the control VLAN.

In one specific example, the splitting of the VLT port 216 may be accomplished by sending a graceful Link Aggregation Control Protocol (LACP) message to the TOR switch device 208 that instructs the TOR switch device 208 to bring the VLT port 216 out of its Link Aggregation Group (LAG). Following the sending of the graceful LACP message, a Link Layer Discovery Protocol (LLDP) message may be sent to the TOR switch device 208 to cause the splitting of the VLT port 216 into the split VLT port 216a and the backup port channel 700. For example, that LLDP message may include a proprietary Type-Length-Value (TLV) structure that includes an action value (e.g., split or merge), a backup port channel identifier (e.g., that identifies the backup port channel 700), and a control VLAN identifier (e.g., that identifies the control VLAN (e.g., VLAN 4094)).

Figure 7A:
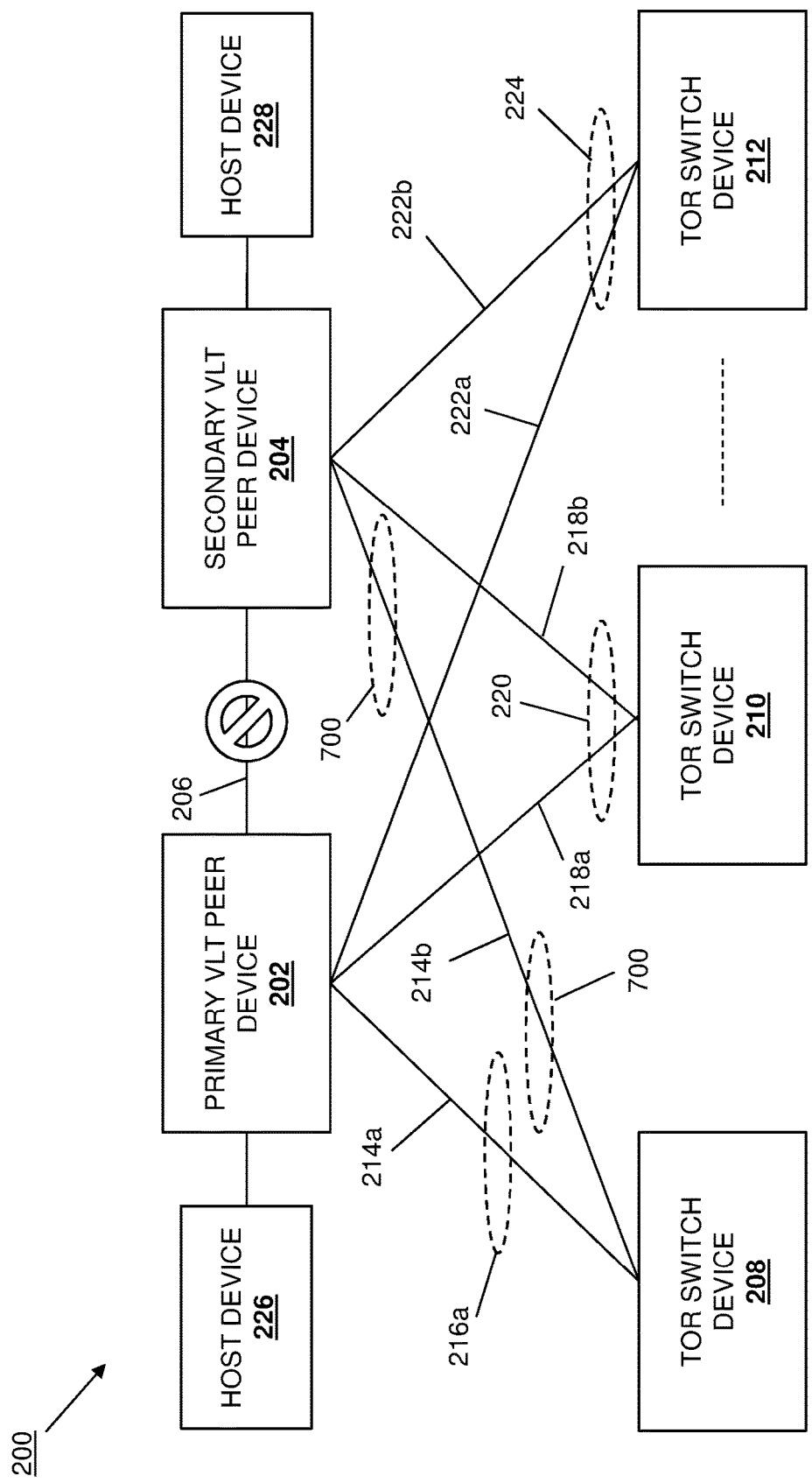
FIG. 7A is a schematic view illustrating an embodiment of the creation of a backup control channel in response to the failed ICL of FIG. 6A.

In an embodiment, the port that receives the LLDP message may be considered the port that is to be separated from the existing port channel (e.g., VLT port 216) and provided as the backup port channel (e.g., backup port channel 700) and, as such, in the example provided in FIG. 7A, the secondary VLT peer device 204 may send the LLDP to the TOR switch device 208 to cause the backup port channel 700 to be separated from the VLT port 216.

In addition, the port failure management engine 304 in the primary VLT peer device 202/300 may operate to add the split VLT port 216a to the control VLAN, and the port failure management engine 304 in the secondary VLT peer device 204/300 may operate to add the backup port channel 700 to the control VLAN. Thus, following block 510, a single VLT port in the VLT fabric (e.g., VLT port 216) has been disturbed to create the backup control channel, while the other VLT ports (e.g., VLT ports 220 and up to 224) remain undisturbed. In addition, the split VLT port 216a may continue to be member of data VLANs for which the VLT port 216 was a member prior to its split and, as such, the data VLAN membership of the VLT port 216 remains undisturbed. It is noted that the backup port channel 700 may not be made a member of any data VLANs in order to prevent loops from forming in the VLT fabric.

Figure 7B:
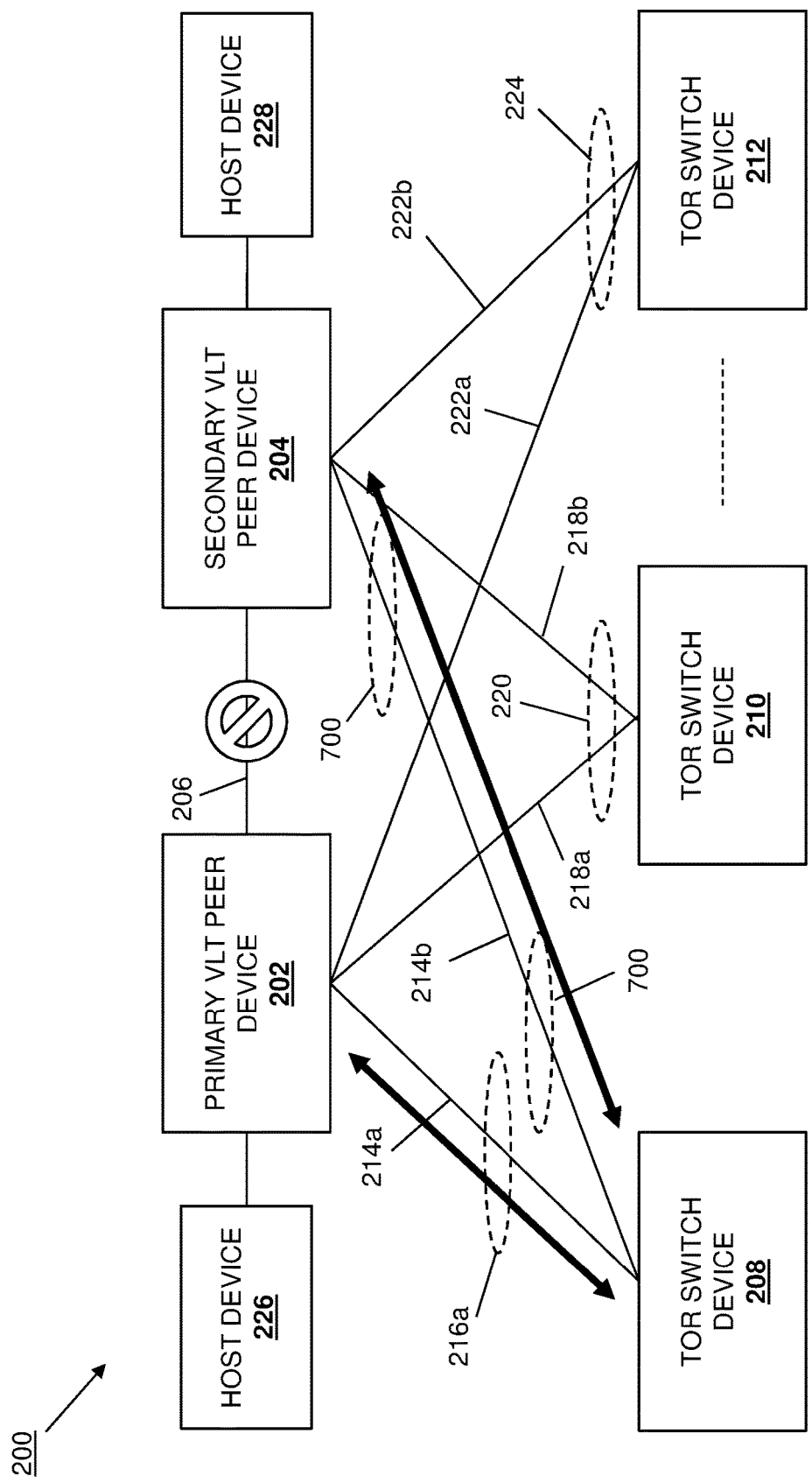
FIG. 7B is a schematic view illustrating an embodiment of the use of the backup control channel of FIG. 7A.
Figure 8B:
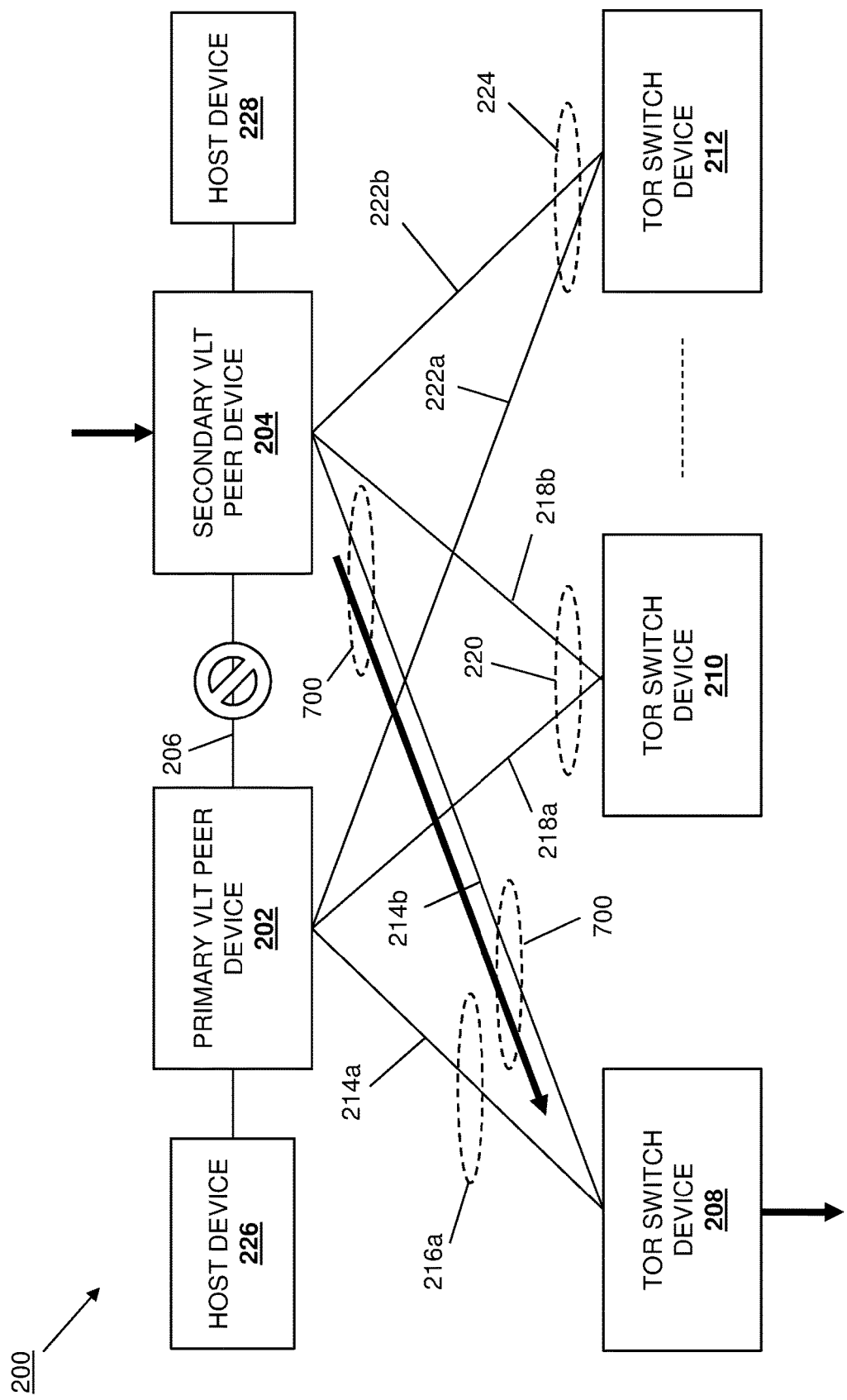
FIG. 8b is a schematic view illustrating an embodiment of data traffic flow in the VLT fabric of FIG. 7A subsequent to ICL failure.

If, at decision block 508, it is determined that a backup control channel has been enabled, or following the enablement of the backup control channel at block 510, the method 500 proceeds to block 512 where the backup control channel between the VLT peer devices is utilized. In an embodiment, at block 512 the primary VLT peer device 202 may utilize the backup control channel to transmit data to the secondary VLT peer device 204, and the secondary VLT peer device 204 may utilize the backup control channel to transmit data to the primary VLT peer device 202 (e.g., local MAC addresses that have been learned, Local ARP information that has been learned, incorrectly hashed packets that need to be tunneled to the correct VLT peer device, etc.) For example, as illustrated in FIG. 7B, the port failure management engine 304 in the primary VLT peer device 202/300 may send control information, an incorrectly hashed packet, and/or other data through the split VLT port 216a to the TOR switch device 208 such that the port failure engine 404 in the TOR switch device 208/400 forwards that data through the backup port channel 700 to the secondary VLT peer device 204. Similarly, as illustrated in FIG. 7B, the port failure management engine 304 in the secondary VLT peer device 204/300 may send control information, an incorrectly hashed packet, and/or other data through the backup port channel 700 to the TOR switch device 208 such that the port failure engine 404 in the TOR switch device 208/400 forwards that data through the split VLT port 216a to the primary VLT peer device 202. With reference to FIG. 8B, the VLT fabric 200 is illustrated with the ICL 206 unavailable. As can be seen, the VLT port 216 previously provided on links 214a and 214b has been replaced with the VLT port 216a on link 214a, and the backup port channel 700 on link 214b. However, as described herein, the backup port channel 700 may only be a member of the control network (and not the data network.) A tunnel may be created in the control network in order to carry traffic received at the secondary VLT peer device 204 through the backup port channel 700/link 214b to the TOR switch device 208 for forwarding to its destination, and/or transmittal through the VLT port 216a/link 214a to the primary VLT peer device 202.

The method 500 then proceeds back to decision block 504 where it is determined whether the ICL between the VLT peer devices has become available. If, at decision block 504, it is determined that the ICL between the VLT peer devices has not become available after its unavailability, the method 500 proceeds back through blocks 508, 510, and 512 to either continue to utilize the backup control channel, or enable and use a new backup control channel. In an embodiment, at block 512 in subsequent iterations of the method 500 following the enablement of the primary backup control channel, the primary VLT peer device 202 and the secondary VLT peer device 204 may continue to utilize the primary backup control channel substantially as discussed above as long as the ICL 206 is unavailable. However, in some embodiments, the primary backup control channel may become unavailable following its enablement and prior to the ICL 206 becoming available. For example, the split VLT port 216*a* and the backup port channel 700 may become unavailable in the event the TOR switch device 208 becomes unavailable. In such a situation, at the corresponding iteration of block 510 and following a determination at decision block 508 that the primary backup control channel is no longer enabled, the primary VLT peer device 202, the secondary VLT peer device 204, and the TOR switch device 210 may operate to enable the secondary backup control channel in substantially the same manner as described above for the primary backup control channel, and then use that secondary backup control channel in substantially the same manner as described above for the primary backup control channel with regard to block 512.

In a specific example of the failure of the primary backup control channel, the port failure management engine 304 in the primary VLT peer device 202 and the secondary VLT peer device 204 may utilize "ping" operations to confirm whether the secondary backup control channel is available and, if so, may operate to enable the secondary backup control channel as discussed above. Enabling the secondary backup control channel may include the port failure management engine 304 in the primary VLT peer device 202 sending a message (e.g., the LLDP message discussed above) to the TOR switch device 208 that causes the TOR switch device 208 to merge the split VLT port 216*a* and the backup port channel 700 into the VLT port 216, followed by each of the primary VLT peer device 202, the secondary VLT peer device 204, and the TOR switch device 208 operating as discussed above to split the VLT port 220 into the secondary backup control channel. In addition, in response to enabling the secondary backup control channel, the port failure management engine 304 in the primary VLT peer device 202 and the secondary VLT peer device 204 may also operate to elect a tertiary backup control channel in substantially the same manner as described above for electing backup control channel(s) with reference to block 502, and may then operate to enable that tertiary backup control channel in the event the secondary backup control channel becomes unavailable. As such, the ICL failure management system 200 may be configured to deal with ICL failures, as well as the failures of multiple backup control channels as well. In the event the backup control channels are all unavailable, the VLT ports to both the primary VLT peer device 202 and the secondary VLT peer device 204 may be kept in an available/operational state (e.g., as illustrated in FIG. 6A.)

If, at decision block 504, it is determined that the ICL between the VLT peer devices has become available after its unavailability, the method 500 proceeds to block 506 where the ICL is utilized. In addition, at block 506, the port failure management engine 304 in the primary VLT peer device 202 may operate to remove the split VLT port 216*a* from the control VLAN, the port failure management engine 304 the secondary VLT peer device 204 may operate to remove the backup port channel 700 from the control VLAN, and the port failure management engine 304 in each of the primary VLT peer device 202 and the secondary VLT peer device 204 may operate to add the ICL 206 to the control VLAN and communicate that operation to the TOR switch device 208. In response to that communication, the port failure engine 404 in the TOR switch device 208 may operate to remove the split VLT port 216*a* and the backup port channel 700 from the control VLAN, and combine/merge the split VLT port 216*a* and the backup port channel 700 to provide the VLT port 216.

Thus, systems and methods have been described that provide for the management of failure in an ICL between VLT peer devices by selecting a VLT port that spans those VLT peer devices and is connected to a TOR switch device to provide respective backup control channel in the event of that failure. In the event the ICL becomes unavailable, that VLT port is caused to split to provide first port (e.g., the VLT port) and a second port (e.g., a backup port channel) that are each added to a control VLAN, which allows VLT control information to be sent between the VLT peer devices via the TOR switch device while the ICL is unavailable. In some embodiments, a secondary backup control channel may be provided for use when both the ICL and a primary backup control channel are unavailable. Upon recovery of the ICL (e.g., when the ICL has become available again), the first port and the second port may be removed from the control VLAN, and the ICL may be used for transmitting any further control information. The systems and methods of the present disclosure solve many of the problems associated with conventional ICL failure management techniques, and eliminate the need for VLT heartbeat mechanisms that are utilized when making one of the VLT peer device unavailable due to an ICL failure (in order to ensure a VLT peer device is not being made unavailable when the other VLT peer device is already unavailable.)

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An Inter-Chassis Link (ICL) failure management system, comprising:
    a first switch device;
    a second switch device that is coupled to the first switch device by an Inter-Chassis Link (ICL) that is included in a control network and that is configured to provide a primary control channel for transmitting control information between the first switch device and the second switch device; and
    a third switch device that is coupled to each of the first switch device and the second switch device by a first aggregated link, wherein the first switch device is configured to:
        determine that the ICL is unavailable and, in response, cause a first port and a second port that are included on the third switch device and that provide the first aggregated link to be added to the control network to provide a primary backup control channel; and
        send control information to the second switch device through the primary backup control channel via the first port and the second port.

2. The system of claim 1, wherein each of the first switch device and the second switch device are configured to:
 select, prior to determining the unavailability of the ICL, the first aggregated link as the primary backup control channel.

3. The system of claim 2, further comprising:
 a fourth switch device that is coupled to each of the first switch device and the second switch device by a second aggregated link, wherein each of the first switch device and the second switch device are configured to:
 select, prior to determining the unavailability of the ICL, the second aggregated link as a secondary backup control channel.

4. The system of claim 1, wherein the causing the first port and the second port that provide the first aggregated link to be added to the control network includes:
 sending, to the third switch device, an instruction to split the first aggregated link to provide the first port and the second port.

5. The system of claim 1, wherein the first switch device is configured to add the first port to the control network, and wherein the second switch device is configured to add the second port to the control network.

6. The system of claim 1, wherein the first switch device is configured to:
 determine that the ICL has become available following its unavailability;
 cause the first port and the second port to be removed from the control network; and
 send control information to the second switch device through the ICL.

7. An Information Handling System (IHS), comprising:
 a communication system;
 a processing system coupled to the communication system; and
 a memory system that is coupled to the processing system and that is configured to execute instructions from the memory system to provide an Inter-Chassis Link (ICL) failure management engine that is configured to:
 determine that an ICL, which is included in a control network and configured to provide a primary control channel for transmitting control information to a first switch device from the communication system, is unavailable, and, in response, cause a first port and a second port, which are included on a second switch device and which provide a first aggregated link to the second switch device that is provided between the communication system and the first switch device, to be added to the control network to provide a primary backup control channel; and
 send control information to the first switch device through the primary backup control channel via the first port and the second port.

8. The IHS of claim 7, wherein the ICL failure management engine is configured to:
 select, prior to determining the unavailability of the ICL, the first aggregated link as the primary backup control channel.

9. The IHS of claim 8, wherein the ICL failure management engine is configured to:
 select, prior to determining the unavailability of the ICL, a second aggregated link to a third switch device as a secondary backup control channel.

10. The IHS of claim 9, wherein the ICL failure management engine is configured to:
 determine that the primary backup control channel is unavailable;
 cause a third port and a fourth port, which provide the second aggregated link to the third switch device, to be added to the control network as the secondary backup control channel; and
 send control information to the first switch device through the secondary backup control channel via the third port and the fourth port.

11. The IHS of claim 7, wherein the causing the first port and the second port that provide the first aggregated link to be added to the control network includes:
 sending, to the second switch device, an instruction to split the first aggregated link to provide the first port and the second port.

12. The IHS of claim 7, wherein the ICL failure management engine is configured to add the first port to the control network, and wherein the first switch device is configured to add the second port to the control network.

13. The IHS of claim 7, wherein the ICL failure management engine is configured to:
 determine that the ICL has become available following its unavailability;
 cause the first port and the second port to be removed from the control network; and
 send control information to the first switch device through the ICL.

14. A method for Inter-Chassis Link failure management, comprising:
 determining, by a first switch device, that an Inter-Chassis Link (ICL) is unavailable, wherein the ICL is included in a control network and configured to provide a primary control channel for transmitting control information to a second switch device from the first switch device;
 causing, by the first switch device, a first port and a second port on a third switch device to be added to the control network to provide a primary backup control channel, wherein the first port and the second port provide a first aggregated link to the third switch device, and wherein the first aggregated link is coupled to the first switch device and the second switch device; and
 sending, by the first switch device, control information to the second switch device through the primary backup control channel via the first port and the second port.

15. The method of claim 14, further comprising:
 selecting, by the first switch device prior to determining the unavailability of the ICL, the first aggregated link as the primary backup control channel.

16. The method of claim 15, further comprising:
 selecting, by the first switch device prior to determining the unavailability of the ICL, a second aggregated link to a fourth switch device as a secondary backup control channel.

17. The method of claim 16, further comprising:
 determining, by the first switch device, that the primary backup control channel is unavailable;
 causing, by the first switch device, a third port and a fourth port to be added to the control network as the secondary backup control channel, wherein the third port and the fourth port provide the second aggregated link to the fourth switch device; and
 sending, by the first switch device, control information to the first switch device through the secondary backup control channel via the third port and the fourth port.

18. The method of claim 14, wherein the causing the first port and the second port that provide the first aggregated link to be added to the control network includes:

sending, by the first switch device to the third switch device, an instruction to split the first aggregated link to provide the first port and the second port.

19. The method of claim 14, wherein the first switch device adds the first port to the control network, and wherein the second switch device adds the second port to the control network.

20. The method of claim 14, further comprising:
determining, by the first switch device, that the ICL has become available following its unavailability;
causing, by the first switch device, the first port and the second port to be removed from the control network; and
sending, by the first switch device, control information to the second switch device through the ICL.

* * * * *